Oct. 25, 1927.

J. MEDLOCK

AUTOMOBILE LIGHT

Filed Dec. 8, 1924

1,646,828

2 Sheets-Sheet 1

Inventor:
John Medlock,
by Wallace R. Lane.
Atty.

Oct. 25, 1927.
J. MEDLOCK
1,646,828
AUTOMOBILE LIGHT
Filed Dec. 8, 1924
2 Sheets-Sheet 2
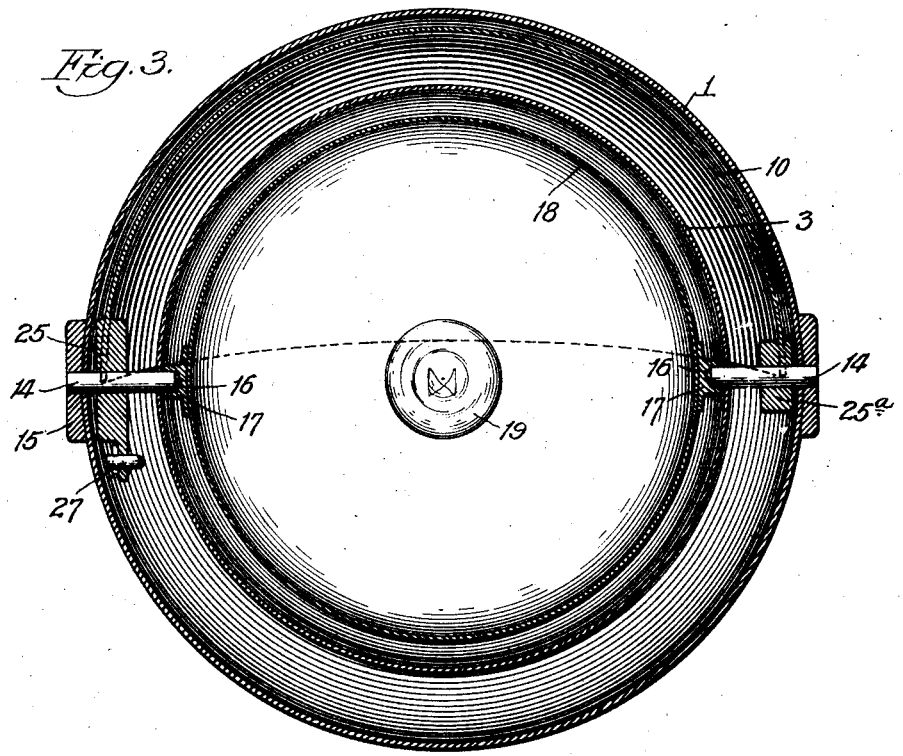
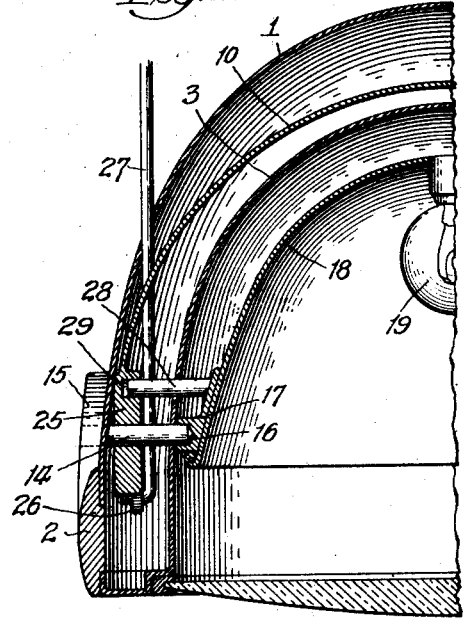
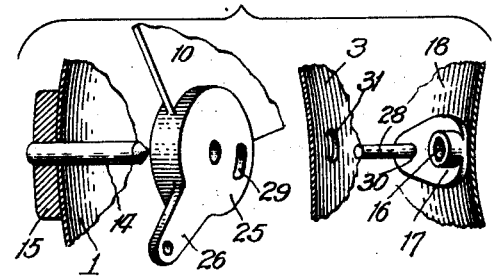
Inventor:
John Medlock,
by Wallace R. Lane.
Atty.

Patented Oct. 25, 1927.

1,646,828

UNITED STATES PATENT OFFICE.

JOHN MEDLOCK, OF CHICAGO, ILLINOIS.

AUTOMOBILE LIGHT.

Application filed December 8, 1924. Serial No. 754,457.

The present invention relates to lights, such as head lights and the like adapted for use on automotive vehicles.

Among the objects of the invention are to provide a novel light having means, preferably in the form of a movable hood, deflector or cowl for preventing diffusion of the rays of light and the eliminating of glare and blinding effects, yet permitting the operation of vehicles with an adequate amount of light or light intensity without necessitating dimming; to so construct and arrange the parts as to still present the same general appearance of the lights generally in use; to secure safety by avoiding the effects of glare; to provide for concentrating the rays of light and directing the same upon the part of the road necessitating strong lighting, preferably by the use of a tilting reflector with or without the tilting of the source of light; to provide for tilting the reflector in time relation with the moving or rocking of the hood, deflector or cowl; to provide for closing the opening through which the hood or deflector moves, when the hood or deflector is in retracted position in the casing of the light; to provide for releasably holding the reflector in normal position but permitting the tilting of the reflector upon the application of the proper force; to provide for the discharge or escape of foreign matter that may have entered and accumulated in the casing; to provide means connected to the movable parts and located where they may be readily operated at the will of the driver; and to provide for such other objects, capabilities and advantages as will later appear and are inherently possessed by the invention.

Figure 1:
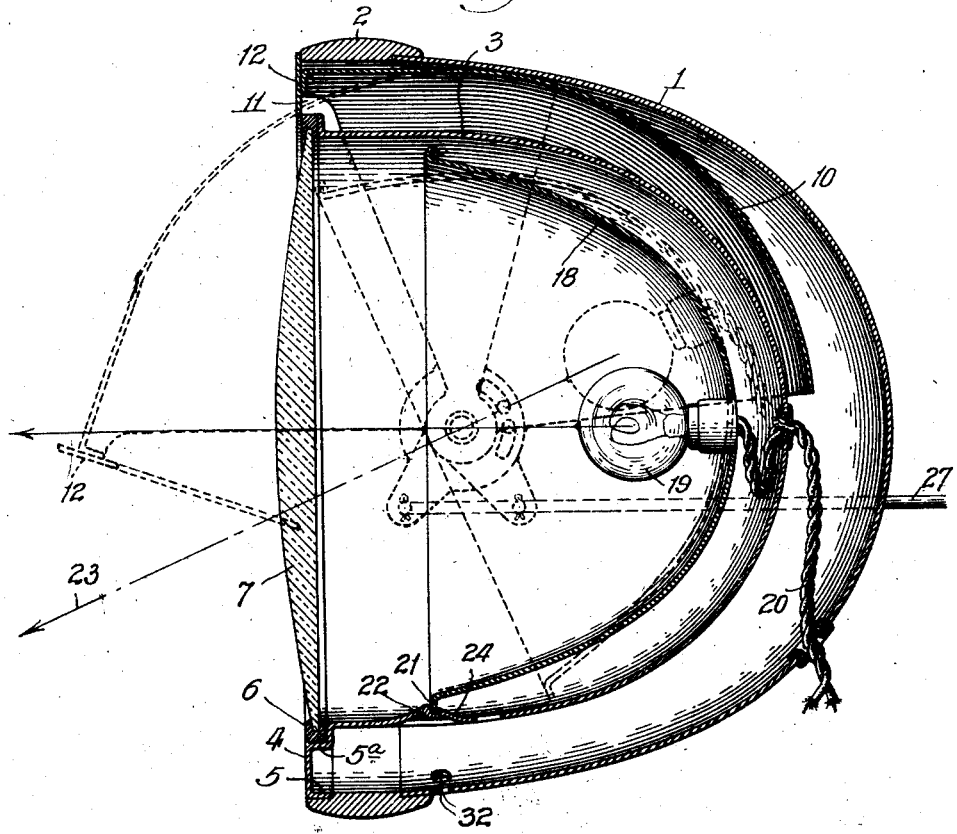
Figure 2:
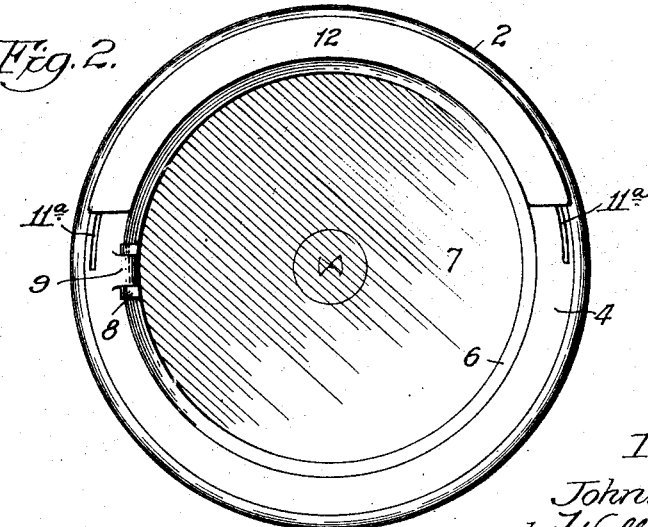

In the drawings illustrating an embodiment of the invention, Figure 1 is a vertical and longitudinal sectional view of such a device; Figure 2 is an end view of the front end of the device; Figure 3 is a transverse sectional view of the same; Figure 4 is a fragmentary horizontal sectional view of the same; and, Figure 5 is a fragmentary detail view of cooperative parts of the device shown in separated assembly.

Referring now more in detail to the drawings, the embodiment chosen to illustrate the invention is shown as comprising an outer casing 1 of general paraboloid shape and having a band or ring 2 secured in any suitable manner to the open end of the casing 1, and an inner casing 3 of similar shape to the outer casing and having at its open end a shouldered ring 4 having a flange 5 suitably secured to the ring or band 2, as clearly shown in Figure 1 of the drawings. The ring 4 has a shoulder $5^a$ carrying a packing or holding ring 6 suitably grooved to receive the edge of a lens 7. The holding ring 6 is preferably hinged by the hinge lugs 8 and 9 to the ring 4 as clearly shown in Figure 2 of the drawings.

The casings 1 and 3 are preferably spaced from each other to receive therebetween a hood or deflector 10 in the shape of a hollow and semi paraboloid with its forward open end extending through a suitable arc shaped opening 11 provided at the upper part of the device and between the lens ring 6 and the ring 2, the shape of the opening 11 being such as to permit the outward movement of the hood or deflector 10 into a rocked or tilted position as shown by dotted lines in Figure 1 of the drawings. Slots $11^a$ may be provided in the ring 4 at the ends of the opening 11 for permitting the projecting of the rear wall portions of the hood to the exterior when the hood is in rocked position. The front end of the hood preferably carries a closing plate 12 of general arc shape to normally close the opening or slot 11 when the hood is in retracted position between the casings 1 and 3, as shown in full lines in Figure 1 of the drawings.

The hood or deflector 10 is preferably mounted for rocking or rotating movements upon a pair of axially alined trunnions 14 extending through the opposite sides of the light and the inner and outer casings as clearly shown in Figures 3 and 4 of the drawings. The outer ends of the trunnions 14 are secured to bosses 15 connected in any suitable manner to or forming a part of the ring 2, and the inner ends of the trunnions extend into the interior of the inner casing to form pivotal bearings 16 for the hubs 17 secured to the opposite sides of a reflector 18 of paraboloid form and located within the inner casing, the reflector 18 suitably carrying a source of light 19 to which may be connected electrical conductors 20 leading through a suitable aperture in the rear end of the inner casing 3 and through a lower aperture in the outer casing 1, as clearly shown in Figure 1 of the drawings. Normally the reflector is held in substantially horizontal or coaxial position with respect to the axes of the inner and outer casings and is provided at its lower edge with a lip 21 engaging in a groove of a resiliently pressed-up portion 22 formed in the lower part of the inner casing 3, the resilience of the part 22 and the lip 21 being such as to permit the ready release of the lip 21 from the part 22 upon the application of suitable force when it is desired to tilt the reflector so as to direct the rays of light therefrom and from the light source in an inclined direction as shown by the arrow 23 in Figure 1 of the drawings. Upon the return movement of the reflector the lip 21 will be guided over the inclined surface 24 of the raised portion and then engaged in the groove thereof.

For rotatably or rockably supporting the hood, the latter is provided with a pair of bearings 25 and 25ª rotatable upon the trunnions 14 in the space between the casings 1 and 3, and the bearing 25 is provided with a suitable arm or crank 26 apertured to receive the end of a rod 27 leading to an accessible part of the vehicle within ready reach of the driver whereby the operation of the rod will cause a rocking or tilting of the hood to and from the dotted line and full line positions shown in Figure 1 of the drawings.

When tilting the hood to the dotted line position shown in Figure 1, the diffused rays of light from the reflector and source of light which would ordinarily cause a glare or blinding effect, are cut off, yet the rays of light are not cut off from being directed upon the surface of the road over which the vehicle is traveling. When thus tilting or rocking the hood it may be desirable to, at the same time, cause a tilting or rocking of the reflector 18 and the structure is shown as herein provided with suitable connections between the hood and deflector to effect this result. This construction is shown as comprising a pin 28 having an end thereof extending into an elongated recess or slot 29 in the bearing member 25 and having the other end thereof extending into or secured in an aperture 30 formed in a flanged portion of the hub 17 secured to the reflector. The pin 28 also extends through an elongated slot 31 formed in the side wall of the inner casing 3. By this arrangement a certain amount of lost motion or loose play is permitted between the hood or deflector 10 and the reflector 18 so that the tilting movement of the reflector may be retarded in timed relation with respect to the movement of the hood or deflector 10 from its nested position in the casings toward the projected position shown in dotted lines in Figure 1 of the drawings. The retardation of the movement of the reflector, as resiliently resisted by the engagement of the lip 21 in the groove of the spring member 22, is effected by initial movement of the hood or deflector 10 and bearing member 5 to the length of the slot 29 until the end of the latter engages with the pin 28 at which instant the reflector begins to move toward its tilted position. Both the hood and the reflector then move in unison until the pin 28 reaches the upper end of the slot 31 provided in the side wall of the inner casing 3 when the hood and reflector are brought to a stop in the projected and tilted position of the same respectively and as shown in dotted line positions thereof in Figure 1 of the drawings. Upon return movement the hood may first move until the opposite end of the slot 29 engages the pin 28 when the reflector is then moved, together with the hood toward the retracted or nested position until the lip 21 engages into the groove of the spring portion 22 and at which instant the pin 28 would reach the lower end of the slot 31 provided in the side wall of the inner casing 3. From the above it will be apparent that the slot 31 serves the purpose of limiting the angular movements of the hood and reflector.

The outer casing 1 may be provided, in the lower portion thereof, with suitable apertures 32, for the discharge or escape of any dirt, water, or other like or similar foreign matter that may have entered into or accumulated in the casings.

While I have herein described and upon the drawings shown an illustrative embodiment of the invention, it is to be understood that the invention is not limited thereto but is intended to comprehend other constructions, details and arrangements of parts without departing from the spirit thereof.

Having thus disclosed my invention, I claim:

1. A light comprising inner and outer casings, a reflector in the inner casing and a source of light in the reflector, a deflector movably located between said casings and adapted to be moved to cut off glare producing rays of light emitted from the reflector and the source of light, and means connected to the reflector and the deflector for moving the reflector upon the movement of the deflector.

2. A light comprising an inner and an outer casing and means for holding the casings in spaced relation, a deflector mounted between said casings and having means for moving the deflector exteriorly for cutting off glare producing rays of light, a reflector, means connected to said deflector and said reflector for moving the reflector, and a source of light in the reflector.

3. A light comprising spaced inner and outer casings, a reflector, a source of light in the reflector, a deflector movable in and out of the space between said casings, and means for pivotally mounting said deflector and said reflector whereby the deflector may be rocked to cut off glare producing rays of light and the reflector may be moved to direct the rays of light in an inclined direction.

4. A light comprising a casing, trunnions carried by the casing and extending therein, a reflector rotatably mounted on said trunnions, a light source in the reflector, and a hood rotatably supported on said trunnions and adapted to move into and out of the space between the casing and the reflector, said hood being adapted to cut off glare rays when moved out of the casing and said reflector being adapted to direct the rays of light at an inclination when the reflector is tilted, and means connected to said hood and said reflector for tilting the reflector upon the rotating of the hood, said means having a pin and a slot connection for effecting the retarded movement of the reflector after the start of the movement of the hood.

5. A light comprising a casing, trunnions carried by the casing and extending therein, a reflector rotatably mounted on said trunnions, a light source in the reflector, and a hood rotatably supported on said trunnions and adapted to move into and out of the space between the casing and the reflector, said hood being adapted to cut off glare rays when moved out of the casing and said reflector being adapted to direct the rays of light at an inclination when the reflector is tilted, and means connected to said hood and said reflector for tilting the reflector upon the rotating of the hood, and a rod connected to said means and operable for moving said hood and reflector.

6. A light comprising an outer casing, an inner casing, trunnions carried by the outer casing and extending within the inner casing, a reflector supported on said trunnions for tilting of the reflector about the axis of said trunnions, and means between said casings and connected to said reflector for tilting said reflector about the axis of said trunnions.

7. A light comprising an outer casing, an inner casing, trunnions carried by a casing, a reflector supported on said trunnions for tilting of the reflector about the axis of said trunnions, a hood movable between said casings and rotatably mounted on said trunnions for rocking action into and out of said casings, and means connected to said hood and said reflector for causing a tilting of the reflector upon the rocking of said hood.

8. A light comprising a casing, means for mounting a lens in the casing and having an opening between the lens and the casing, a reflector behind the lens, a source of light in the reflector, and a hood movable in and out through said opening and adapted when moved outward for shielding against transmission of glare rays of light from the reflector and the light source, and means carried by said hood for closing said opening when said hood is moved into said casing.

9. A light comprising a casing, means for mounting a lens in the casing and having an opening between the lens and the casing, a reflector behind the lens, a source of light in the reflector, and a hood movable in and out through said opening and adapted when moved outward for shielding against transmission of glare rays of light from the reflector and the light source, and means carried by said hood for effecting the closing of said opening when said hood is moved into said casing, said means having a pin and slot connection for effecting a retarded movement of the reflector when being tilted by the hood.

In witness whereof, I hereunto subscribe my name to this specification.

JOHN MEDLOCK.